United States Patent Office 2,701,223
Patented Feb. 1, 1955

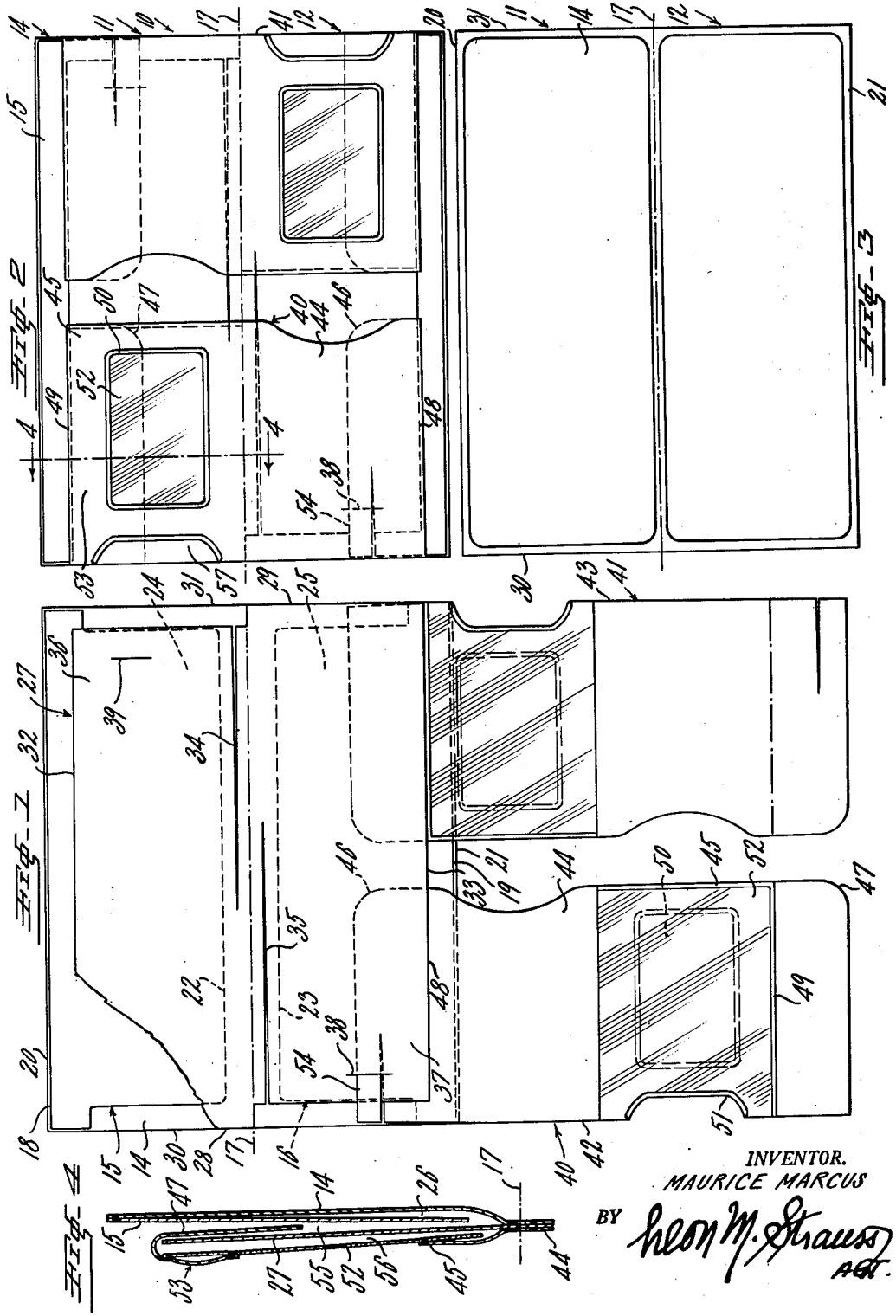

2,701,223

METHOD OF MANUFACTURING PLASTIC WALLETS

Maurice Marcus, New York, N. Y.

Application January 12, 1952, Serial No. 266,234

2 Claims. (Cl. 154—118)

This invention relates to a method of producing wallets from plastic material and the resultant assembled wallets derived from the method.

In recent years various industries have replaced conventional fabricating materials with plastic stock for reasons of economy and workability. However, the use of plastic material to replace leather for wallets has been seriously curtailed due to the difficulties in handling the small pieces of plastic material which are employed in assembling wallets and similar articles. Further, it is necessary to fabricate a wallet from a relatively light-gauge material which is bendable to permit manipulation of the wallet and accordingly such wallet has very little body and is readily deformed out of desired shape. In addition, the use of flat plastic stock detracts from the appearance and saleability of the completely fabricated wallet as compared to a leather wallet which can be readily laminated to achieve the desired appearance of heavy gauge material yet retains the requisite bending qualities.

Accordingly, it is an object of this invention to provide a method of producing wallets from plastic stock which obviates the foregoing and other disadvantages.

It is another object of the present invention to provide a simplified method for the manufacture of wallets from relatively light-gauge plastic stock, so that the finished wallet derived therefrom simulates the more desirable appearance of a wallet construction of heavier gauge material.

It is a further object of the present invention to provide means contributing to improved method steps for the production of wallets with considerable body and rigidity yet exhibiting the requisite bendability necessary for manipulating the wallet.

A still further object of the present invention is to provide a new and improved method of fabricating wallets from plastic stock in which the pieces employed in the construction are reduced in number and are of a size facilitating handling and assembly of the wallets.

It is a still further object of the present invention to provide a wallet constructed from a relatively inexpensive plastic material which simulates the appearance of leather to thereby materially improve the appearance and saleability of the wallet.

It is a still further object of the present invention to provide means rendering possible the construction of a wallet which exhibits the advantageous features of leather and the likewise desirable characteristics of plastic, namely, durability, ruggedness and glossiness.

The above and still further objects of the present invention will become apparent upon consulting the following detailed description when taken in conjunction with the drawing, wherein:

Fig. 1 is a plan view of a pair of wallets constructed according to the present invention, shown in partially assembled condition and with parts folded back and further parts broken away or shown in phantom;

Fig. 2 is a top plan view of a pair of wallets fabricated according to the method of the present invention, shown in assembled condition and prior to being severed.

Fig. 3 is a bottom plan view of the pair of wallets shown in Fig. 2; and,

Fig. 4 is an enlarged fragmentary sectional view taken along the line 4—4 of Fig. 2 and in the direction of the arrows.

Referring now to the drawing, there is shown in Fig. 1 a pair of wallets partially assembled in accordance with the present invention. The various parts which are preferably stamped out by dies are fabricated of any suitable flat plastic stock of a gauge selected to permit the parts to be bent for assembly and during use of the completed wallet.

The wallet assembly 10 from which a pair of wallets 11,12 is to be produced in side by side relation includes an outer wall or cover 14 which is substantially rectangular and of a width sufficient to form the wallets 11, 12 in side by side relation and of a length selected in accordance with the desired length of the wallets 11, 12.

Superimposed upon the outer wall or cover 14 are a pair of partitions 15, 16 which are arranged on opposite sides of the longitudinal center line 17 of the outer wall 14 with the outer side edges 18, 19 thereof substantially coinciding and coextensive with the adjacent respective side edge 20, 21 of the outer wall 14. The inner side edge 22, 23 of the partitions 15, 16 are spaced from the longitudinal center line 17 for a purpose to be later described.

The end of each of the partitions 15, 16 is cut away from the inner side edge thereof toward and terminating short of the outer side edge thereof to form the respective flaps 24, 25 which cooperate with adjacent confronting portions of the outer wall or cover 14 to define secret pockets for the respective wallets, designated by the numeral 26 in Fig. 4.

Each of the flaps 24, 25 can be withdrawn from within the respective assembled wallet, as will subsequently become apparent, to facilitate the insertion in and removal of papers and the like from the secret pocket 26.

Placed over the partitions 15, 16 is an inner wall or stay 27 which has end edges 28, 29 coextensive with the end edges 30, 31 of the outer wall while side or longitudinal edges 32, 33 of the stay are spaced inwardly of the coextenive outer end edges of partitions 15, 16 and outer wall 14. The inner wall 27 is provided with a pair of longitudinally extending slits 34, 35 which extend inwardly from opposite end edge 28, 29.

The slits are arranged on opposite sides of the longitudinal center line 17 of the inner wall 27 and extend in overlapping relation at the center region of the inner wall 27. The end edge 28 is cut away between slit 35 and side edge 33 to form an adjustable tongue 36 for wallet 11. Similarly, the end edge 29 is cut away between slit 34 and side edge 32 to form an adjustable tongue 37 for wallet 11. The adjustable tongues 36, 37 are provided with transverse slits 38, 39 for a purpose to be subsequently described.

Arranged transversely of the inner wall 27 are the pocket forming strips 40, 41 which are spaced from each other with the outer side edges 42, 43 coextensive with the end edges 30, 31 of the outer wall 14. The pocket forming strips are of similar structure with the respective parts thereof reversed in position with respect to each other, as seen in Figs. 1 and 2. Accordingly it will suffice to describe only one in detail.

The pocket forming strip 42 includes pocket walls 44, 45 joined together along adjacent sides thereof. Projecting outwardly from the opposite sides of the walls 44, 45 are the flaps 46, 47 which are preferably formed integrally with the walls 44, 45 and joined thereto along fold or crease lines 48, 49. The wall 45 is provided with a cut-out window opening 50 and is cut away along the outer side edge 42, as indicated at 51. Abutting the inner face of wall 45 is a transparent stiffener or reinforcing member 52 which is joined to the latter along the bounding portions of the cut away 51, along crease line 49, along the inner side edge of the wall 45, and along the bounding portions of the window opening 50.

The stiffener 52 is preferably bonded to the pocket wall 45 by heat sealing. As seen in Figs. 1 and 4, the stiffener 52 is not joined to the wall 45 adjacent wall 44. More-over, air can be trapped between the stiffener 52 and the wall 45 to raise the portions of wall 45 bounding window 50 to thereby form a cushioned frame 53 for the window 50, as illustrated in Fig. 4, by disposing a greater length of said wall 45 than of said stiffener 52 between a first line about said window 50 and a second line spaced therefrom along crease 49 and the edges of wall 45. The flap 46 is provided with a tab 54 which is receivable within slit 38 of inner wall 27 upon insertion of the flap 46 between partition 16 and inner wall 27. The flap 47 is likewise insertable between partition 15 and inner wall 27.

The partially assembled arrangement of Fig. 1 has been illustrated for the purposes of clarity. Actually the various pieces are brought into the position of Fig. 2 whereupon heat and pressure are applied to the thus formed assembly to secure the pieces together.

The heat and pressure is applied, as indicated in Fig. 3, along the coextensive side and end edges and along and on opposite sides of the longitudinal center line 17 of the outer wall 14 inwardly of the inner side edges 22, 23 of the partitions 15, 16. Accordingly there is formed the two completely assembled wallets 11, 12 which are joined together and can be separated by severing along the line 17. When separated, the peripheral edges of the wallets 11, 12 are bonded together to form trimming rims for the respective wallets, as clearly seen in Fig. 3.

When severed the wallets 11, 12 are of exactly the same construction as becomes apparent when wallet 12 is turned end for end. Accordingly, only one of the wallets will be described in assembled condition. For example wallet 11 is formed of the upper half of outer wall 14, the upper half of inner wall 27 including the adjustable tongue 36, the partition 15 interposed between the walls 14, 27 and cooperating with outer wall 14 to form secret pocket 26 which is rendered accessible upon removal of flap 24 and further cooperating with inner wall 27 to form the money pocket 55 (Fig. 4), the wall 45 of strip 40 cooperating with inner wall 27 to form a pocket 56 with a window opening 50, and the opposite wall of strip 41 cooperating with inner wall 27 to form another pocket.

As clearly shown in Fig. 2 the cutaway 51 provides a slot 57 which, in conjunction with pocket 56, defines an open ended channel adapted to receive a supporting member of a card holder (not shown).

The wallet thus formed has a very attractive appearance due to the peripheral rim and the cushioned frame 53 and further is very durable since all the seams thereof are formed by heating sealing or bonding.

The method of producing the pair of wallets 11, 12 from the plastic material comprises the steps of:

1. Arranging on a flat support a substantially rectangular piece of said material of a width sufficient to form the outer walls of a pair of wallets positioned in side by side relation with respect to each other.
2. Superimposing on said outer wall a pair of partitions of said material arranged on opposite sides of the longitudinal center line of said outer wall and having opposite outer side edges coextensive with the opposite side edges of said outer wall.
3. Placing over said partitions an inner wall of said material having opposite side edges spaced inwardly of said opposite outer side edges of said partitions and having opposite end edges arranged coextensive with the opposite end edges of said partition and said outer wall.
4. Arranging two pocket forming strips transversely of said inner wall and spaced from each other with the opposite outer side edges thereof coextensive with the opposite end edges of said outer wall.
5. Folding opposite end portions of each of said strips into spaces between said inner wall and said partitions.
6. Cutting out a window in each of said strips adjacent one end thereof.
7. Bonding a transparent reinforcing member to each of said pocket forming strips along a first line about said windows, respectively, and along a second line spaced from said windows, a greater length of said pocket forming strips than of said transparent reinforcing members being disposed between said first and second lines, whereby said pocket forming strips define a cushioned frame for said windows, respectively.
8. Applying heat and pressure to the thus formed assembly along said coextensive side and end edges and on opposite sides of said longitudinal center line inwardly of the inner side edges of said partitions to form a pair of assembled wallets arranged side by side and joined together adjacent to said longitudinal center line.
9. Separating said pair of assembled wallets from each other.

In constructing wallets according to the present invention it may be desirable to fabricate the outer wall or cover 14 with or without the partitions 15, 16 separate from the remainder of the wallet construction.

For example, the inner wall or stay 27 can be arranged on a flat support and the pocket-forming strips 40, 41 may be superimposed thereon. As previously pointed out the pocket-forming strips 40, 41 are arranged with the open outer side edges 42, 43 coextensive with the opposite side edges 28, 29 of the inner wall or stay 27.

The flaps 46, 47 of each of the pocket-forming strips 40, 41 may then be folded beneath the stay 27, the tabs 54 being engaged in the respective slits 38, 39. The thus formed assembly may be subjected to heat and pressure along the coextensive end edges and on opposite sides of the longitudinal center line 17 to form pocket-forming inserts arranged side by side and joined together. The pocket-forming inserts may then be separated and each will include (as clearly seen in Fig. 4) one-half of the stay 27 and adjacent halves of the pocket-forming strips 40, 41 with the associated flaps 46, 47.

Each of the inserts may then be joined to a suitable cover or outer wall such as the outer wall 14. The joining may be effected by heat sealing if the outer wall 14 is fabricated of plastic or if the outer wall is to be fabricated of leather, the pocket-forming insert may be sewed to the outer wall or attached thereto by means of suitable fasteners. In lieu of an outer wall, it may be desirable to attach the pocket-forming insert to a well-known cover structure having slide fastener means all along the peripheral edges thereof to thereby facilitate enclosure of the aforesaid insert within the interior of the cover.

In this latter case the insert may be attached to the cover or interchangeably mounted thereon or supported in the cover by means of the flaps 46, 47 which may be engaged within slots or slits provided in the cover. It can thus be seen that the pocket-forming inserts may be employed in conjunction with plastic, leather or similar covers. Further the insert may be used with any cover either provided with or without a secret pocket.

A preferred method and means for producing wallets according to the present invention has been disclosed but it is well understood that modifications and variations can be made within the scope of the appended claims.

Having thus described the invention, what is claimed as new and desired to be secured by Letters Patent, is:

1. The method of producing at least one pair of wallets each in assembled condition and fabricated of plastic sheet material comprising the steps of arranging on a flat support a substantially rectangular piece of said material of a width sufficient to form the outer walls of a pair of wallets positioned in side by side relation with respect to each other, superimposing on said outer wall a pair of partitions of said material arranged on opposite sides of the longitudinal center line of said outer wall and having opposite outer side edges coextensive with the opposite side edges of said outer wall, placing over said partitions an inner wall of said material having opposite side edges spaced inwardly of said opposite outer side edges of said partitions and having opposite end edges arranged coextensive with the opposite end edges of said partition and said outer wall, arranging two pocket forming strips transversely of said inner wall and spaced from each other with the opposite outer side edges thereof coextensive with the opposite end edges of said outer wall, folding opposite end portions of each of said strips into spaces between said inner wall and said partitions, cutting out a window in each of said strips adjacent one end thereof, bonding a transparent reinforcing member to each of said pocket forming strips along a first line about said windows, respectively, and along a second line spaced from said windows, a greater length of said pocket forming strips than of said transparent reinforcing members being disposed between said first and second lines, whereby said pocket forming strips define a cushioned frame for said windows, respectively, applying heat and pressure to the thus formed assembly along said coextensive side and end edges and on opposite sides of said longitudinal center line inwardly of the inner side edges of said partitions to form a pair of assembled wallets arranged side by side and joined together adjacent to said longitudinal center line, and separating said pair of assembled wallets from each other.

2. A method according to claim 1, including the step of cutting away a portion of each of said partitions adjacent said inner side edges and said end edges to form a flap removable from between said outer and inner walls of the respective assembled wallets.

References Cited in the file of this patent

UNITED STATES PATENTS

| Number | Name | Date |
|---|---|---|
| 1,937,384 | Hess | Nov. 28, 1933 |
| 2,429,979 | Broughton | Nov. 4, 1947 |
| 2,511,303 | Stevens et al. | June 13, 1950 |
| 2,524,306 | Buzzerd | Oct. 3, 1950 |
| 2,576,826 | Dobbs et al. | Nov. 27, 1951 |
| 2,598,755 | Birch | June 3, 1952 |
| 2,647,071 | Schade | July 28, 1953 |